(12) United States Patent
Huin

(10) Patent No.: US 11,557,224 B2
(45) Date of Patent: Jan. 17, 2023

(54) AUDIO MOBILITY MAP

(71) Applicant: FEELOBJECT, Toulouse (FR)

(72) Inventor: Sylvain Huin, Plaisance du Touch (FR)

(73) Assignee: FEELOBJECT, Clermont-Ferrand (FR)

(*) Notice: Subject to any disclaimer, the term of this patent is extended or adjusted under 35 U.S.C. 154(b) by 206 days.

(21) Appl. No.: 16/962,564

(22) PCT Filed: Jan. 10, 2019

(86) PCT No.: PCT/FR2019/050049
§ 371 (c)(1),
(2) Date: Sep. 22, 2020

(87) PCT Pub. No.: WO2019/141922
PCT Pub. Date: Jul. 25, 2019

(65) Prior Publication Data
US 2021/0248920 A1 Aug. 12, 2021

(30) Foreign Application Priority Data
Jan. 16, 2018 (FR) ...................................... 1850334

(51) Int. Cl.
*G09B 21/00* (2006.01)
*G06F 3/02* (2006.01)
*G06F 3/16* (2006.01)

(52) U.S. Cl.
CPC ......... *G09B 21/004* (2013.01); *G06F 3/0219* (2013.01); *G06F 3/16* (2013.01); *G09B 21/007* (2013.01)

(58) Field of Classification Search
CPC .......... G06F 3/0219; G06F 3/16; G06F 3/167; G09B 21/004; G09B 21/007; G10L 13/027
See application file for complete search history.

(56) References Cited

U.S. PATENT DOCUMENTS

| | | | |
|---|---|---|---|
| 6,267,598 B1* | 7/2001 | Allen, Jr. ................ | G09F 25/00 40/584 |
| 2008/0280265 A1* | 11/2008 | Lopez-Jaime ....... | G09B 21/003 434/112 |

(Continued)

OTHER PUBLICATIONS

International Search Report for International Application No. PCT/FR2019/050049 dated Mar. 21, 2019, 2 pages.

(Continued)

*Primary Examiner* — Priyank J Shah
(74) *Attorney, Agent, or Firm* — TraskBritt

(57) ABSTRACT

A system for spatial representation of regions of interest for a visually impaired or blind person, comprises the following elements: at least one tactile map comprises a top surface and a bottom surface, the tactile map having tactile reference marks on the top surface and corresponding contact areas on the bottom surface, each tactile reference mark corresponding to a region of interest; a keyboard with a matrix of contact points configured to come into contact with the corresponding contact areas in response to pressure exerted on the tactile map positioned on the keyboard; and an electronic audio box, which can be actuated by the keyboard, the electronic audio box being provided with a multitude of audio recordings, each audio recording being associated with each tactile reference mark on the top surface of the tactile map.

3 Claims, 3 Drawing Sheets

(56) References Cited

U.S. PATENT DOCUMENTS

| | | | | |
|---|---|---|---|---|
| 2012/0123784 A1* | 5/2012 | Baker | ................. | G09B 21/002 |
| | | | | 704/E11.001 |
| 2016/0148517 A1 | 5/2016 | Bujsaim et al. | | |
| 2020/0042100 A1* | 2/2020 | Fukumoto | .......... | H01H 13/7065 |
| 2020/0133408 A1* | 4/2020 | Esnault | .................. | G06F 3/041 |

OTHER PUBLICATIONS

International Written Opinion for International Application No. PCT/FR2019/050049 dated Mar. 21, 2019, 5 pages.

\* cited by examiner

AUDIO MOBILITY MAP

CROSS-REFERENCE TO RELATED APPLICATIONS

This application is a national phase entry under 35 U.S.C. § 371 of International Patent Application PCT/FR2019/050049, filed Jan. 10, 2019, designating the United States of America and published as International Patent Publication WO 2019/141922 A1 on Jul. 25, 2019, which claims the benefit under Article 8 of the Patent Cooperation Treaty to French Patent Application Serial No. 1850334, filed Jan. 16, 2018.

TECHNICAL FIELD

The present disclosure relates to a mobility map that provides a visually impaired or blind person with the structural information of a place, for example, the plan of each floor of a building.

The present disclosure also relates to a method of manufacturing and using such a mobility map, which can provide a visually impaired person with structural information in a tactile and auditory manner.

BACKGROUND

When a visually impaired person wishes to go to a place that he does not know by heart, he requires the aid of a map or plan. Unlike persons who can see a map, the visually impaired read a map by touching it. Usually, the tactile map comprises symbols engraved in relief on the surface of a plan. Document US2008/0280265 describes a mobility map comprising a series of engraved symbols and/or other icons in relief combining Braille code and other alphanumeric symbols. These symbols are exposed on a surface and are composed of two different panels combined together to form a mobility map or plan. A multi-level hierarchical mobility system is also provided to enable the visually impaired to move freely and find their bearings not only inside a structure like a building, but also inside numerous geographic levels like countries, towns and districts, without losing the structural and/or spatial connection between the different levels.

The drawback of this technology is that the user must memorize the meaning of all of the symbols or icons on the map to be able to read by touching the mobility map without the aid of another person. He lacks other simple means of confirming his interpretation of the information presented on the tactile map.

Furthermore, the multi-layer structure increases the weight of the mobility map, which occupies a great deal of space and is not easy to carry around.

So far, the solution lies in integrating a location system and audio equipment, for example, GPS, into the above-mentioned mobility map. However, this solution makes a map too expensive and not affordable for all users.

BRIEF SUMMARY

The present disclosure proposes a new system to assist a visually impaired or blind person to obtain structural information on an area by associating audio information to each symbol and/or icon that he can touch. This is achieved by converting a signal of pressure exerted on a symbol/icon into an electronic signal serving as an input signal into an electronic box. This electronic audio box reads an audio recording as a result of the action of the user who presses the specific symbol/icon.

At the same time, the present disclosure involves using several tactile maps with the same electronic audio box. Tactile maps can be combined with or separate from the electronic audio box so that the maps can be stacked together in order to save space for storage and transportation. In order to visit different places, the user must simply install the appropriate tactile map on the electronic audio box.

Finally, the interaction between the tactile map and the electronic audio box is made in a simple manner and at an affordable cost for each user.

The present disclosure relates to a system for spatial representation of regions of interest for visually impaired persons that comprises:
- at least one tactile map comprising a top surface and a bottom surface, the tactile map having tactile reference marks on the top surface and corresponding contact areas on the bottom surface, each tactile reference mark being structurally connected to a region of interest;
- a keyboard with a matrix of contact points configured to enter into interaction with the corresponding contact areas in response to pressure exerted on the tactile map positioned on the keyboard;
- an electronic audio box that can be actuated by the keyboard, the electronic audio box being provided with a multitude of audio recordings, each audio recording being associated with each tactile reference mark on the top surface of the tactile map.

In a specific embodiment, the keyboard is a cup membrane, the contact points of the keyboard being formed by cups.

In a variation, the tactile map and the electronic box both contain a Near Field Communication (NFC) device for identification.

The present disclosure also relates to a method for operating a system according to any of the above-mentioned embodiments, the method comprising the steps of:
- installation of a tactile map by positioning its rear face on the keyboard,
- identification of the installed tactile map by the electronic audio box,
- conversion, by the keyboard, of a pressure applied to a tactile reference mark of the tactile map into an electronic signal transmitted to the electronic audio box, and selection of the audio recording associated with the tactile reference mark,
- reading, by the electronic box, of the selected audio recordings in order to provide information on the region of interest corresponding to the tactile reference mark pressed.

The present disclosure also relates to a method of manufacturing a system in which the tactile map is manufactured by polymer three-dimensional printing technology.

BRIEF DESCRIPTION OF THE DRAWINGS

Further advantages and characteristics will emerge from the following detailed description of embodiments that are in no way limiting, as well as from the accompanying drawings, in which.

DETAILED DESCRIPTION

A system for spatial representation of regions of interest for visually impaired or blind persons comprises at least one tactile map, a keyboard and an electronic audio box superimposed to form an assembly. Between the tactile map and the keyboard, there is a physical contact, thanks to which a signal of the pressure applied to the tactile map is transferred to the keyboard. The keyboard converts the pressure signal received into an electronic output signal. There are electronic connections between the keyboard and the electronic audio box. Each electronic output signal of the keyboard precisely selects a corresponding audio recording in the electronic audio box. The following paragraphs explain in detail the structure and function of each component of the system.

Figure 1:
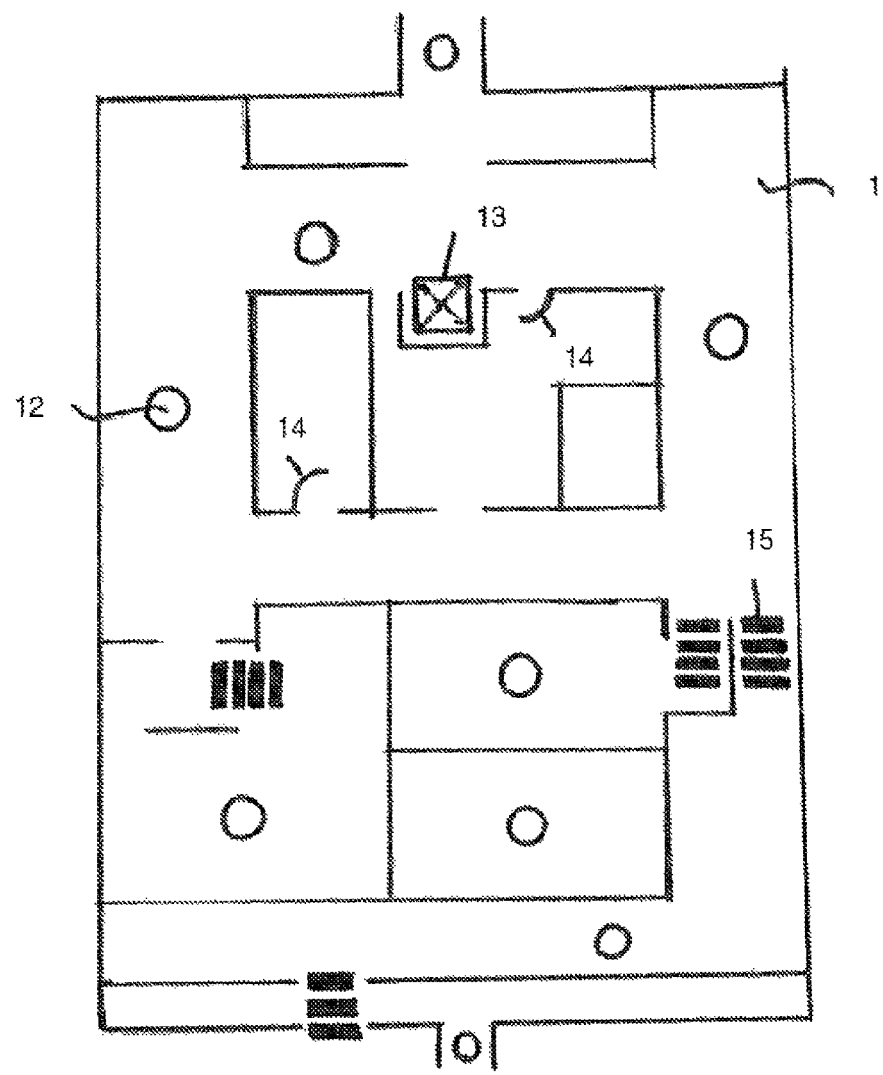
FIG. 1 shows a graphic representation of the top surface of a tactile map according to an embodiment of the present disclosure.

FIG. 1 shows a top surface of a tactile map according to an embodiment of the present disclosure. It relates to a graphic representation of a floor of a building. A group of tactile reference marks, for example, symbols and icons, show a spatial representation of different areas of the building. The tactile reference marks are positioned selectively on the tactile map in FIG. 1 so as to clearly indicate to a person the spatial relationship between the different regions found in this building. A person knowing the definition of the tactile reference marks can touch the floor plan of FIG. 1 and understand the position of the rooms, offices, doors and stairs in relation to this building, for example. Even a person who does not understand the meaning of the symbols can understand the map by pressing the tactile reference marks and listening to the explanation of the meaning connected with each one.

For the purpose of illustration, the circles 12 in FIG. 1 represent the information panels that a person can find on the wall of the building. The lines represent enclosed rooms or offices shared or divided. Symbol 13 represents a lift and comprises a polygon with 4 faces engraved on the inside with a cross-shaped element. Symbol 14 represents a door and comprises an engraved half circle, which represents the direction of rotation of the door. Symbol 15 represents the stairs and comprises thick parallel bars.

Figure 2:
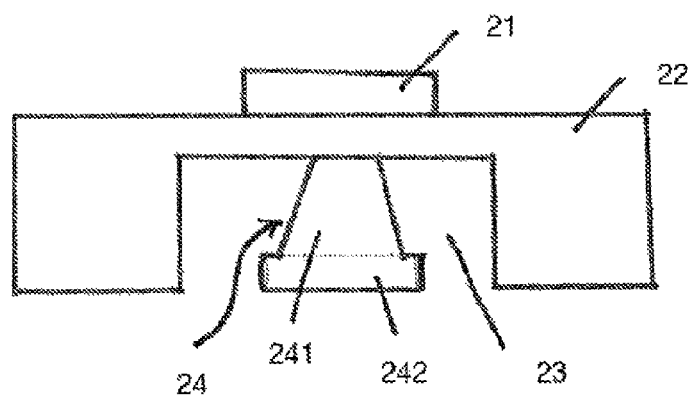
FIG. 2 shows a cross-sectional view of the contact area beneath the tactile map.

FIG. 2 is a cross-sectional view of the structural details of the tactile map. A symbol area 21 is raised on the top of the surface and usually measures 10×10 mm in order to give a pleasant sensation to the touch. Beneath the symbol area 21 is a bearing surface 22 of between 0.2 and 0.4 mm thick, which gives good resistance to the bearing surface and the flexibility required to bend when pressed. Beneath the bearing surface 22 is a cylindrical hollow area 23 to provide good flexibility to the bearing surface. In the middle of the hollow area 23 is a dumbbell-shaped contact area 24. This contact area 24 is composed of two parts, a trapezium-shaped column 241 to preserve good flexibility of the symbol area, and a disk 242 at the bottom of the trapezium to achieve easy positioning in relation to the keyboard. The diameter of the disk is smaller than the size of the symbol area, but sufficiently large to have good positioning tolerance in relation to the keyboard.

Manufacturing the tactile map by using three-dimensional (3D) printing technology is a real advantage. More particularly, there are at least two types of 3D printing technologies that are suitable for the manufacture of the tactile map, one based on material provided in the form of wires, the other based on material provided in the form of granules. According to the first technique, the material takes the form of a reel of wire, which is loaded and melted in a nozzle and deposited on a plate layer by layer. The second technique involves using material in the form of small beads, or granules, which are injected onto the surface of the tactile map. The polymer material can, for example, be nylon, which is a good candidate because it has a certain flexibility while maintaining its shape. Nylon can be charged with short carbon fibers to improve the rigidity of the map and improve the interaction between the map and the keyboard located thereunder, as a result of the pressure exerted on the map by the finger. Other materials can also be used provided that they fulfill the above-mentioned function. This tactile map is manufactured with a thickness of 0.4-2 mm, preferably 1 mm, to give great flexibility around the tactile reference marks so that when pressure is applied to the tactile reference mark, the region around this tactile reference mark can easily be bent downwards in order to transfer the pressure to the keyboard located beneath the tactile map.

Figure 3:
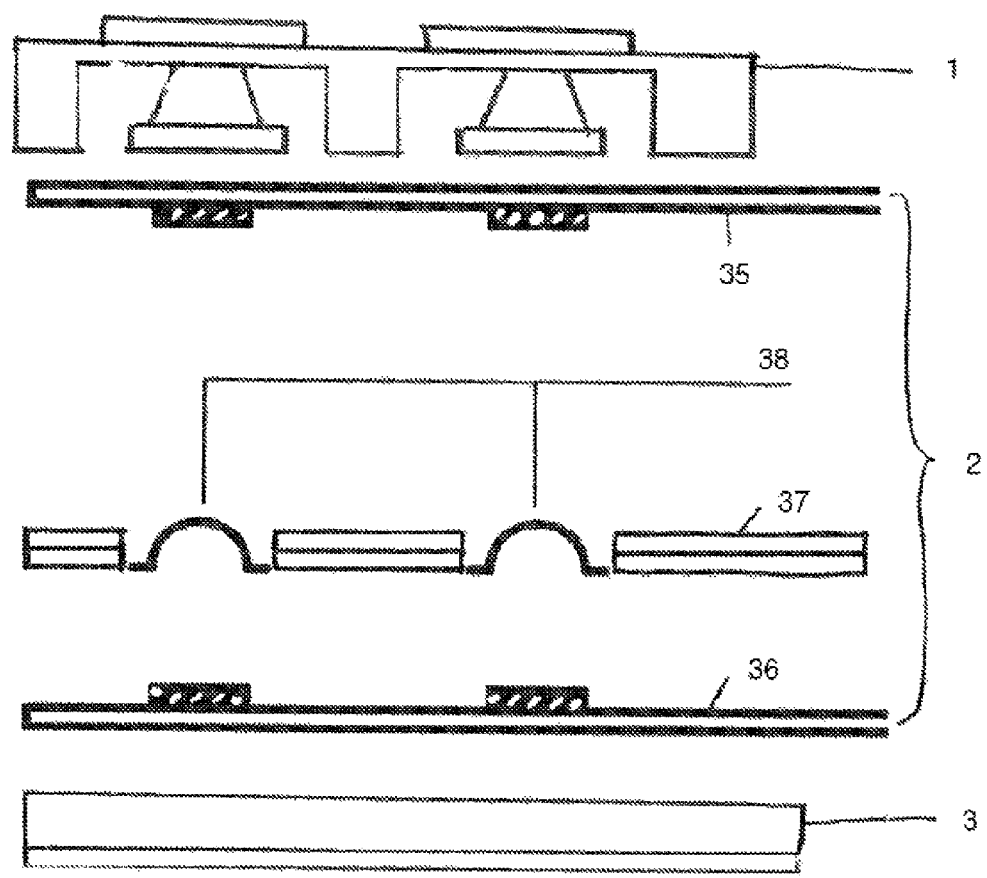
FIG. 3 shows the side view of the system comprising the tactile map, the keyboard and the electronic audio box.

The following paragraph explains the interaction between the tactile map and the electronic audio box via the keyboard. FIG. 3 shows the side view of the system comprising the tactile map 1, the keyboard 2 and the electronic audio box 3.

There is two-level identification between the tactile map and the electronic audio box: the first level is to identify the tactile surface and the second level is to identify a symbol on this tactile surface. This two-level identification makes it possible to locate a specific region on the mobility map, for example, a specific office on a particular floor of a building.

The first identification level is in order to recognize a series of similar places, for example, the different level of a building, or the different sections connected to passages. A plurality of tactile maps is manufactured, each tactile map being encoded with a different icon or a Braille code to be identified by touch.

In order to communicate with the electronic audio box, each tactile map contains a Near Field Communication (NFC) chip. As soon as a tactile map is installed on an electronic audio box, the map is automatically identified by the electronic audio box, which is also equipped with an NFC chip.

The electronic audio box has a memory to store several audio recordings, each recording being associated with a tactile map. On identifying a specific tactile map, the associated audio recording is selected and downloaded so as to be active in the electronic audio box. This saves the downloading time for reading the recording once the second level of identification has been performed.

The second identification level is in order to recognize a specific region of the tactile map. The pressure signal received from the tactile reference mark of the tactile map is converted into an electronic signal and transmitted to the audio electronic box in order to select a specific recording from among all of the active audio recordings. The electronic audio box reads the selected audio recording.

The conversion and transmission of the signal are performed by the interaction between the tactile map and a keyboard. The surface of the tactile map can be divided like a two-dimensional (2D) matrix, each reference mark on the top face of the tactile map, associated with a contact area beneath the tactile map, corresponding to a node of the 2D matrix.

The keyboard is also equipped with a two-dimensional matrix of contact points, each contact point being located at a matrix node. The matrix of the tactile map and the matrix of the keyboard overlap so that beneath the contact area 24 of each symbol, there is a corresponding contact point on the keyboard. When a symbol is pressed down on the tactile map, the symbol area bends and creates a contact between the contact area of the tactile map and the contact area of the keyboard. The keyboard selects an audio recording in the electronic audio box describing the region represented by the symbol pressed on the tactile map.

A dome keyboard is used here as it offers several advantages: reliability, speed and tactile sensation. It is proved that the dome keyboard withstands environmental conditions very well and reacts rapidly to the pressure applied. Moreover, it is incorporated with the electronic part, which allows a customized and modular product to be produced at a reasonable price.

The dome keyboard has the structure of a sandwich with different layers superimposed from top to bottom. The top and bottom outer layers are made of rubber or silicone in order to prevent humidity. Once sealed, they make the keyboard watertight. Between the membranes are the top and bottom circuit surfaces 35 and 36; the contact between them gives information on the location of the signal. And between the circuit surfaces, there is a spacer layer 37 with either an individual dome 38 located at the openings of the spacer layer, or a matrix of connected domes. As each layer can be manufactured with a very fine thickness, this technology has the advantage of enabling the production of thin keyboards with small distances between keys.

The domes have the property of being deformed under the pressure of the finger and resuming their shape as soon as the pressure is released. The keyboard dome makes it possible to obtain confirmation that a contact has been achieved by a tactile sensation. A pressure exerted on the dome instantly triggers a contact between the top and bottom circuit surfaces. Moreover, this type of keyboard can be used in different applications where there are severe constraints, such as in fields where strength and water-tightness are required.

The keyboard is placed on an aluminum surface 0.8-1.5 mm thick in order to create a flat and rigid surface.

When a user enters a building, he can install the tactile map of the ground floor on the electronic audio box. When he presses the symbol representing the entrance, the pressure signal received at this symbol is transmitted to the keyboard. The user then perceives the deformation and reformation of the corresponding dome. The pressure signal on the dome is transmitted and converted into an electronic signal that selects an audio recording corresponding to the ground floor entrance of this building. For example, the sound can correspond to a phrase: "This is the ground floor entrance, in front is a corridor, on the left an office and on the right a staircase."

When the user climbs the stairs to the second floor, he can identify the tactile map of the second floor by touching a precise region where there is specific code, for example, the Braille code. When he installs the tactile map of the second floor on the electronic audio box and presses the entrance symbol, the tactile map is identified by the box and the signal of pressure on the symbol is transmitted. He hears the words: "This is the second floor entrance, in front is a corridor, on the left an office and on the right a staircase."

The present disclosure relates not only to a portable mobility map but also to a large-format mobility map fixed in the building. Large-format mobility maps can be fixed to a piece of furniture in different places, on the floor or on a wall, for example, at the entrance, before and after each staircase and at each elevator. These large-format mobility maps have the same function that provides visually impaired or blind persons with structural information about the building in a tactile and auditory manner.

The invention claimed is:

1. A method for operating a system for spatial representation of regions of interest for a visually impaired or blind person, the method comprising:
   providing a system, including:
      at least one tactile map comprising a top surface and a bottom surface, the tactile map having tactile reference marks on the top surface and corresponding contact areas on the bottom surface, each tactile reference mark corresponding to a region of interest;
      a keyboard with a matrix of contact points configured to enter into contact with the corresponding contact areas in response to pressure exerted on the tactile map positioned on the keyboard; and
      an electronic audio box that can be actuated by the keyboard, the electronic audio box being provided with a multitude of audio recordings, each audio recording being associated with a respective tactile reference mark on the top surface of the tactile map;
   installing the tactile map by positioning a rear face of the tactile map on the keyboard;
   identifying the installed tactile map using the electronic audio box;
   converting, by the keyboard, a pressure applied to a tactile reference mark of the tactile map into an electronic signal transmitted to the electronic audio box, and selection of the audio recording associated with the tactile reference mark; and
   reading, by the electronic box, of the selected audio recording and providing information on the region of interest corresponding to the pressed tactile reference mark.

2. The system according to claim 1, wherein the keyboard is a cup membrane keyboard, the contact points of the keyboard being formed by cups.

3. The system according to claim 1, wherein the tactile map and the electronic audio box both contain a Near Field Communication (NFC) device for identification.

* * * * *